(12) United States Patent
Dai

(10) Patent No.: US 7,945,701 B2
(45) Date of Patent: May 17, 2011

(54) TELEVISION WITH MULTIPLE INTERFACES

(75) Inventor: Lung Dai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 138 days.

(21) Appl. No.: 12/463,378

(22) Filed: May 9, 2009

(65) Prior Publication Data

US 2009/0282170 A1 Nov. 12, 2009

(30) Foreign Application Priority Data

May 12, 2008 (CN) .......................... 2008 1 0301546

(51) Int. Cl.
*H04N 11/00* (2006.01)
*H04N 5/44* (2006.01)
*H04N 5/445* (2006.01)
*G06F 3/00* (2006.01)
*G06F 13/00* (2006.01)

(52) U.S. Cl. ............ 710/2; 348/552; 348/553; 348/563; 348/564; 710/16; 715/716; 715/718; 725/38; 725/59

(58) Field of Classification Search .................. 348/552, 348/553, 563, 564, 844; 710/1, 2, 15, 16; 715/700, 716–718; 725/38, 59, 74, 80, 82, 725/85, 105, 118, 121, 131–133, 143, 152, 725/153

See application file for complete search history.

(56) References Cited

U.S. PATENT DOCUMENTS

| 7,561,215 | B2 * | 7/2009 | Kim et al. ...................... 348/734 |
| 2007/0083888 | A1 * | 4/2007 | Liebhold ......................... 725/37 |
| 2007/0268936 | A1 | 11/2007 | Kim et al. |
| 2008/0178085 | A1 * | 7/2008 | Miyazaki et al. ............. 715/716 |

FOREIGN PATENT DOCUMENTS

CN 101079978 A 11/2007

OTHER PUBLICATIONS

Sony Grand Wega (TM) LCD Projection TV HD-TV Operating Instructions KDF-E42A10 KDF-E50A10; 2005; Sony Corporation; pp. 1-97.*
High-Definition Multimedia Interface Specification Version 1.1; May 20, 2004; p. CEC-36.*

* cited by examiner

*Primary Examiner* — Alford W Kindred
*Assistant Examiner* — Richard B Franklin
(74) *Attorney, Agent, or Firm* — Frank R. Niranjan

(57) ABSTRACT

A television includes multiple interfaces, a storage medium, an updating module, a processing module and a display module. The multiple interfaces are mounted on a housing of the television, for connecting to peripheral devices. The storage medium stores a table comprising logos of the multiple interfaces and names of the peripheral devices connected to the multiple interfaces. The updating module receives the names of the peripheral devices and updates the table with the names of the peripheral devices. The processing module reads the data of the table stored in the storage medium and converts the data of the table into image signals. The display module visually displays a menu based on the image signals. The menu shows the logos of the multiple interfaces and the names of the peripheral devices connected to the multiple interfaces.

10 Claims, 6 Drawing Sheets

| Device ID 1 | DVD |
| --- | --- |
| Device ID 2 | DV |
| Device ID 3 | PS2 |
| Device ID 4 | Wii |
| Device ID 5 | ... |

TELEVISION WITH MULTIPLE INTERFACES

BACKGROUND

1. Technical Field

Embodiments of the present disclosure relate to televisions with multiple interfaces, particularly to a television capable of displaying names of peripheral devices connected to the multiple interfaces.

2. Description of Related Art

Televisions commonly have multiple interfaces for connecting to peripheral devices. For example, an LCD television commonly includes a composite video broadcast signal (CVBS) interface, a digital visual interface (DVI), a high definition multimedia interface (HDMI), a video graphics array (VGA) interface, a universal serial bus (USB) interface and a separate video (S-video) interface. The above interfaces are commonly mounted on the rear of the LCD television, and may simultaneously be connected to a DVD player, a DV player, a PS2® gaming machine and a Wii® gaming machine. The television can further include a COM interface, a line print terminal (LPT) interface, an IEEE 1394 interface, and so on.

After a user pushes a particular function button of a remote controller, the LCD television can normally display a menu containing logos of the multiple interfaces on a screen. When the user wants to interact with a desired peripheral device connected to the multiple interfaces, the user may operate the remote controller to activate the desired peripheral device by selecting the logo of one of the multiple interfaces that connects to the desired peripheral device. However, the user often forgets connection relationship between the peripheral devices and the multiple interfaces. Consequently, it is inconvenient to the user to ascertain the one of the multiple interfaces that connects to the desired peripheral device.

What is needed, therefore, is a television with multiple interfaces for showing names of the peripheral devices connected to the multiple interfaces.

DETAILED DESCRIPTION

All of the processes described hereinafter may be embodied in, and fully automated via, functional code modules executed by one or more general purpose computers or processors. The code modules may be stored in any type of computer-readable mediums or other storage devices.

Figure 1:
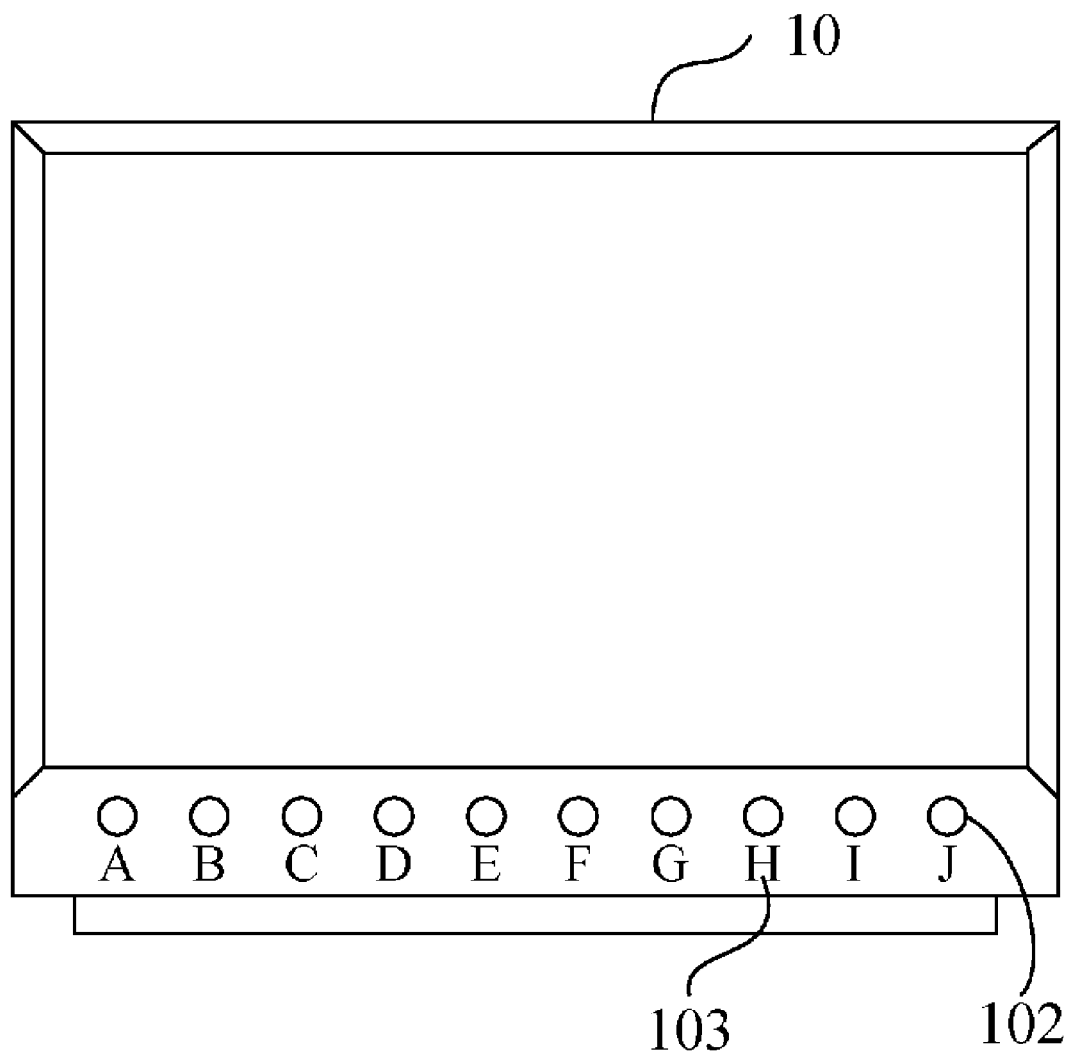
FIG. 1 is a schematic diagram of one embodiment of a rear of a television with multiple interfaces mounted thereon.

FIG. 1 is a schematic diagram of one embodiment of a rear of a television 10 with multiple interfaces 102 mounted thereon. The television 10 includes the multiple interfaces 102 mounted on a housing of the television 10. Positions on the housing of the television 10 in which the multiple interfaces 102 are can vary based on design requirements of the television 10. Logos 103 are marked adjacent to each of the multiple interfaces 102.

Figure 2:
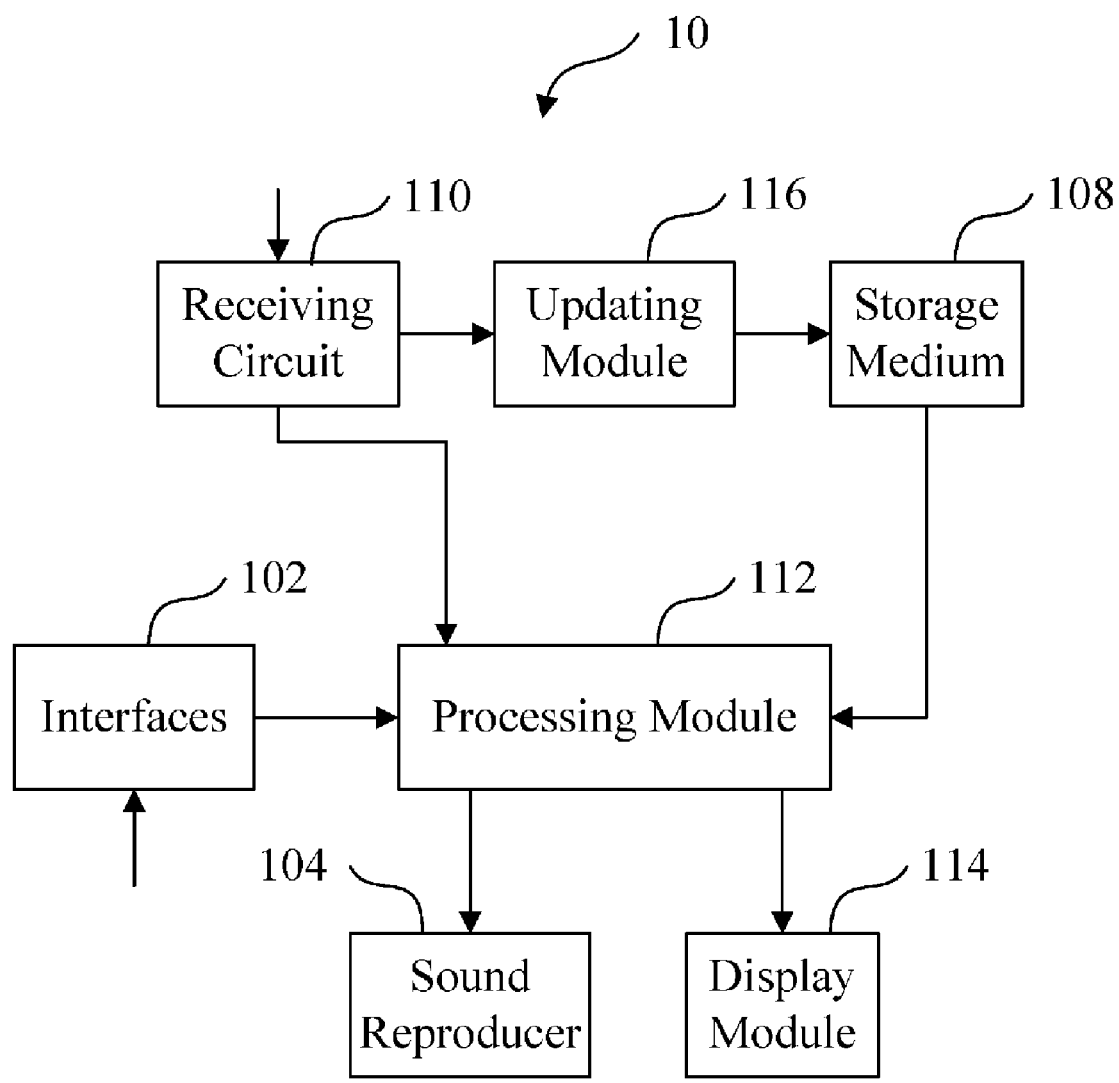
FIG. 2 is a block diagram of a first embodiment of the television in FIG. 1.

FIG. 2 is a block diagram of a first embodiment of the television 10 in FIG. 1. The television 10 includes the multiple interfaces 102, a processing module 112, a sound reproducer 104, a display module 114, and a receiving circuit 110. Each of the interfaces 102 is configured for connecting to a particular peripheral device (not shown). The processing module 112 is configured for receiving composite/separate video and audio signals received through the interfaces 102, handling the composite/separate video and audio signals, sending the audio signals to the sound reproducer 104 and sending the video signals to the display module 114. The sound reproducer 104 reproduces sound based on the audio signals. The display module 114 displays images on a screen of the television 10 based on the video signals. The receiving circuit 110 receives operation commands and characters sent from a command input device (not shown). The operation commands are for signaling the television 10 to power on/off, switch program channels, and run other functions.

Figure 3:
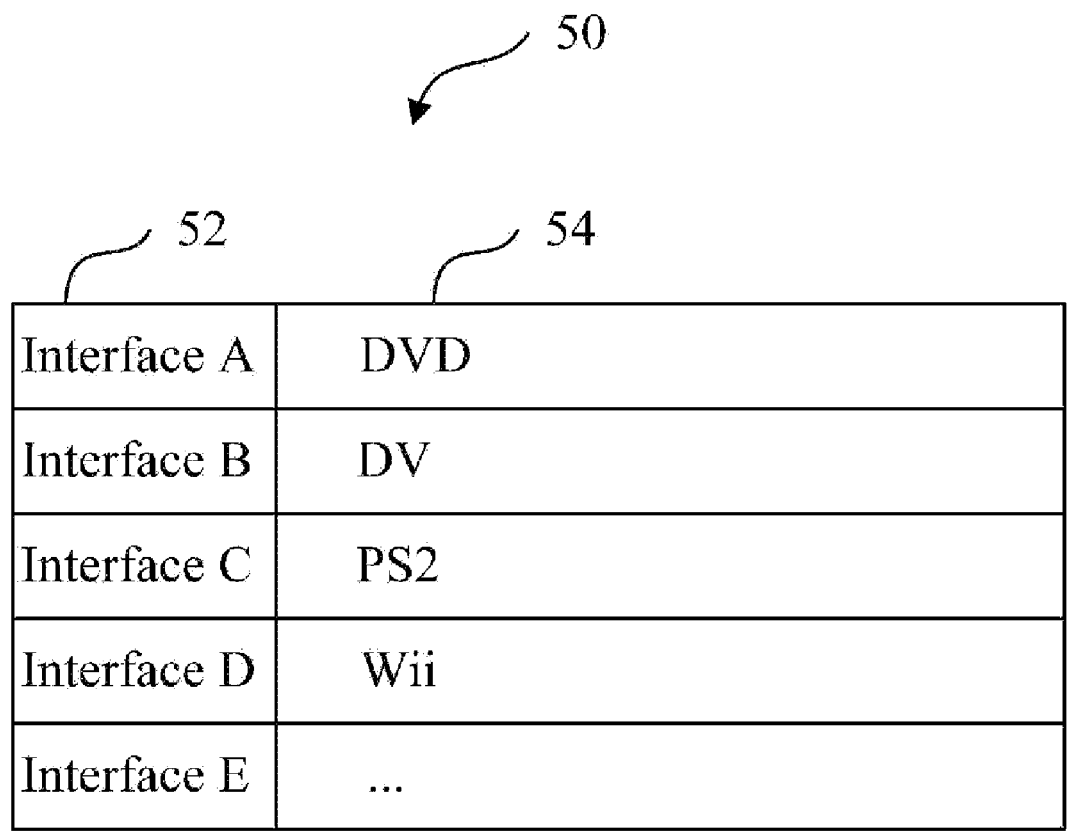
FIG. 3 is a schematic diagram of a table showing logos of the multiple interfaces and names of peripheral devices connected to the multiple interfaces.

The television 10 further includes a storage medium 108 and an updating module 116. Further referring to FIG. 3, the storage medium 108 stores a table having two columns 52 and 54. The first column 52 shows the logos 103 of the multiple interfaces 102, and the second column 54 shows the names of the peripheral devices connected to each of the multiple interfaces 102. In the first embodiment, the user enters the names of the peripheral devices via a keyboard or other input device (not shown) and the input are sent to the receiving circuit 110. The updating module 116 is configured for receiving the names of the peripheral devices sent from the receiving circuit 110 and updating corresponding items showed in the second column 54 with the names of the peripheral devices received by the receiving circuit 110.

Figure 4:
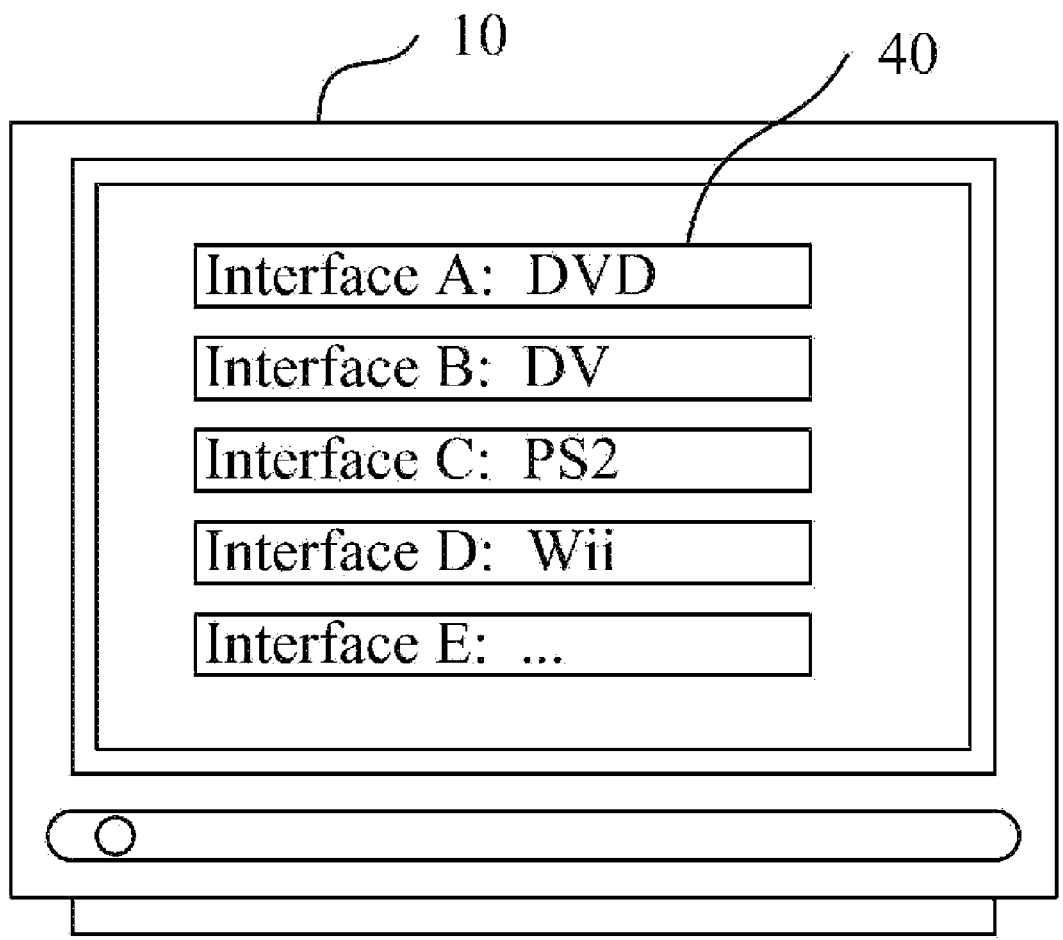
FIG. 4 is a schematic diagram of a front of the television in FIG. 1 displaying a menu containing the logos of the multiple interfaces and the names of peripheral devices connected to the multiple interfaces.

The processing module 112 is further configured for reading data of the table 50 stored in the storage medium 108, converting the data of the table 50 into image signals and sending the image signals to the display module 114 for visually displaying the menu 40 (shown in FIG. 4) based on the image signals. The menu 40 shows the logos of the multiple interfaces 102 and the names of the peripheral devices connected to the multiple interfaces 102. As the names of the peripheral devices are visually displayed next to the logo 103 of each of the multiple interfaces 102 that connects to the peripheral devices, it is convenient for the user to ascertain the desired one of the peripheral devices to be activated.

Figure 5:
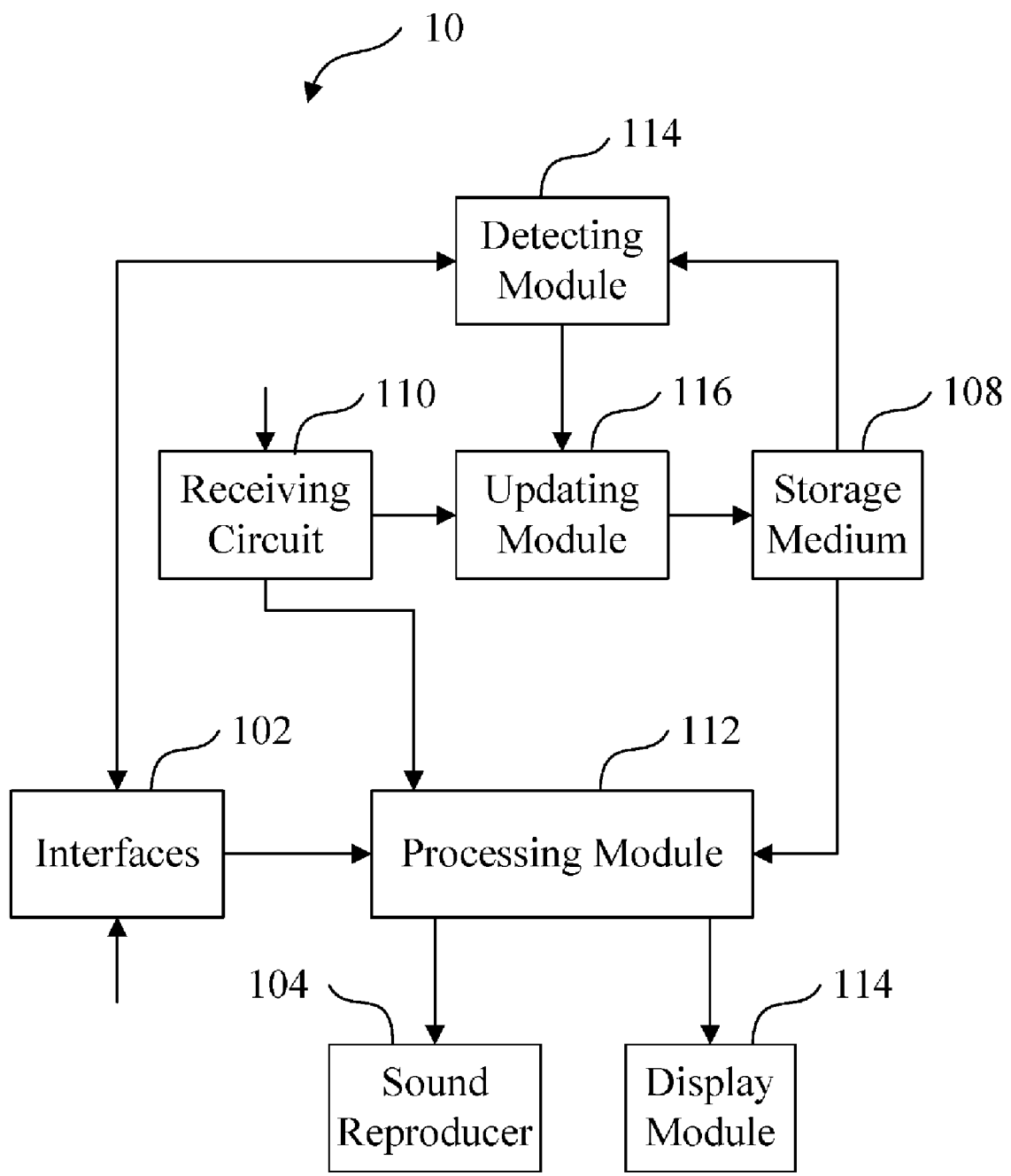
FIG. 5 is a block diagram of a second embodiment of the television in FIG. 1.
Figure 6:
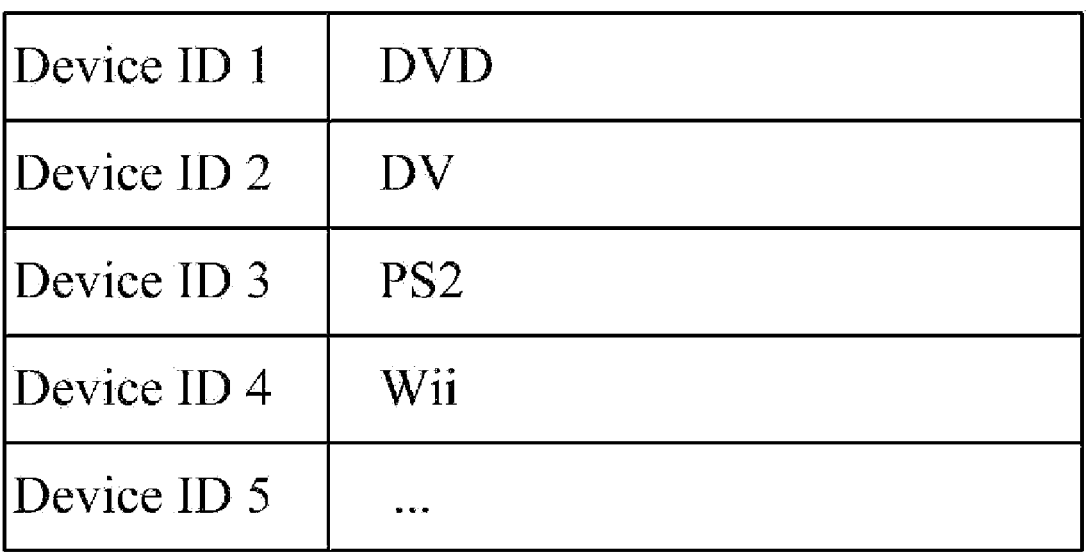
FIG. 6 is a schematic diagram showing a relationship between the peripheral devices and their identification numbers.

FIG. 5 is a block diagram of a second embodiment of the television 10 in FIG. 1. In the second embodiment, the television 10 further includes a detecting module 114. The detecting module 114 is connected to the multiple interfaces 102, the storage medium 108 and the updating module 116. The detecting module 114 is configured for identifying the peripheral devices connected to each of the multiple interfaces 102, and obtaining the names of the peripheral devices, and sends the names of the peripheral devices to the updating module 116. Referring to FIG. 6, as an illustration, the storage medium 108 further stores a relationship between an identification number (i.e., device ID) and the name of each of the peripheral devices. The detecting module 114 gets the identification number stored in one of the peripheral devices and obtains the name of the one of the peripheral devices corresponding to the identification number based on the relationship stored in the storage medium 108, and sends the name of the one of the peripheral devices to the updating module 116.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A television comprising:
   a housing;
   multiple interfaces mounted on the housing, for connecting to peripheral devices;
   a storage medium storing a table comprising logos of the multiple interfaces and names of the peripheral devices connected to the multiple interfaces;
   a detecting module for identifying the peripheral devices connected to each of the multiple interfaces, and obtaining the names of the peripheral devices;
   a processing module for reading data of the table stored in the storage medium and converting the data of the table into image signals; and
   a display module for visually displaying a menu based on the image signals, the menu showing the logos of the multiple interfaces and the names of the peripheral devices connected to the multiple interfaces;
   wherein the storage medium stores a relationship between identification numbers and the names of the peripheral devices, the detecting module gets the identification numbers stored in the peripheral devices and obtains the name of each of the peripheral devices corresponding to each of the identification numbers based on the relationship stored in the storage medium.

2. The television of claim 1, further comprising a receiving circuit for receiving operation commands sent from a command input device, the operation commands signal the processing module to read the data of the table and activate one of the peripheral devices shown in the menu.

3. The television of claim 1, further comprising a receiving circuit for receiving the names of the peripheral devices edited by a command input device.

4. The television of claim 3, wherein the receiving circuit further receives operation commands sent from the command input device, the operation commands signal the processing module to read the data of the table and activate one of the peripheral devices shown in the menu.

5. The television of claim 1, further comprising an updating module for receiving the names of the peripheral devices and updating the table with the names of the peripheral devices.

6. A television comprising:
   multiple interfaces mounted on the television, for connecting to peripheral devices;
   a storage medium storing logos of the multiple interfaces;
   an updating module for receiving names of the peripheral devices connected to the multiple interfaces, and writing the names of the peripheral devices into a table stored in the storage medium to form a relationship between the logos of the multiple interfaces and the names of the peripheral devices;
   a detecting module for identifying the peripheral devices connected to the multiple interfaces, and obtaining the names of the peripheral devices; and
   a display module for visually displaying a menu showing the logos of the multiple interfaces and the names of the peripheral devices;
   wherein the storage medium stores a relationship between identification numbers and the names of the peripheral devices, the detecting module gets the identification numbers stored in the peripheral devices and obtains the name of each of the peripheral devices corresponding to each of the identification numbers based on the relationship stored in the storage medium.

7. The television of claim 6, further comprising a receiving circuit for receiving operation commands sent from a command input device, the operation commands signal the processing module to read the data of the table and activate one of the peripheral devices shown in the menu.

8. The television of claim 6, further comprising a receiving circuit for receiving the names of the peripheral devices edited by a command input device.

9. The television of claim 8, wherein the receiving circuit further receives operation commands sent from the command input device, the operation commands signal the processing module to read the data of the table and activate one of the peripheral devices shown in the menu.

10. The television of claim 6, further comprising a processing module for reading the data of the table stored in the storage medium, converting the data of the table into image signals, and sending the image signals to the display module for visually displaying the menu based on the image signals.

\* \* \* \* \*